(12) United States Patent
Lee et al.

(10) Patent No.: US 8,531,063 B2
(45) Date of Patent: Sep. 10, 2013

(54) LINEAR VIBRATOR

(75) Inventors: Kap Jin Lee, Gyeonggi-do (KR); Hyun O Kim, Gyeonggi-do (KR); Hye Jin Shin, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 261 days.

(21) Appl. No.: 12/756,720

(22) Filed: Apr. 8, 2010

(65) Prior Publication Data

US 2010/0259113 A1 Oct. 14, 2010

(30) Foreign Application Priority Data

Apr. 10, 2009 (KR) .................. 10-2009-0031308

(51) Int. Cl.
*H02K 33/16* (2006.01)

(52) U.S. Cl.
USPC .............................................. 310/30; 310/16

(58) Field of Classification Search
CPC .... H02K 2205/09; H02K 33/02; H02K 33/16
USPC ........................................................ 310/81
See application file for complete search history.

(56) References Cited

U.S. PATENT DOCUMENTS

2008/0306332 A1* 12/2008 Choi et al. .................. 600/38

FOREIGN PATENT DOCUMENTS

| CN | 1424807 A | | 6/2003 |
|----|-----------|---|--------|
| JP | 2003300013 A | * | 10/2003 |
| JP | 2009028640 A | * | 2/2009 |
| WO | WO 2008060060 A1 | * | 5/2008 |
| WO | WO-2009/014184 A1 | | 1/2009 |

OTHER PUBLICATIONS

Sakai et al, JP2003300013A Machine Translation, Oct. 2003.*
Takahashi et al, JP2009028640A Machine Translation, Feb. 2009.*
Office Action dated Mar. 19, 2013 in Chinese Application No. 201010144505.7, filed Apr. 12, 2010.

* cited by examiner

*Primary Examiner* — Burton Mullins
*Assistant Examiner* — Eric Johnson
(74) *Attorney, Agent, or Firm* — Saliwanchik, Lloyd & Eisenschenk

(57) ABSTRACT

A linear vibrator are disclosed, wherein the linear vibrator includes a housing having a bracket and a case coupled to the bracket to form a receiving space, a spring coupled to an inner face of the case, a vibration unit having a magnet, the magnet being coupled to the spring, a coil, which has a hollow-can shape, disposed over the bracket for vibrating the vibration unit by using a magnetic field generated from the magnet and a magnet field generated from the coil, and a substrate electrically connected to the coil and the substrate interposed between the coil and the bracket, the substrate having an air venting portion being communicated with an inner space of the coil and outside of the coil.

19 Claims, 4 Drawing Sheets

LINEAR VIBRATOR

CROSS-REFERENCE TO RELATED APPLICATION

This application claims the benefit under 35 U.S.C. §119 of Korean Patent Application No. 10-2009-0031308, filed Apr. 10, 2009, which is hereby incorporated by reference in its entirety.

BACKGROUND OF THE INVENTION

1. Field of the invention

The present invention relates to a linear vibrator.

2. Description of Related Art

In generally, portable electronic equipment includes a vibration generating device for generating a vibration to alarm a receiving signal of a cellular phone.

A conventional linear vibrator includes a weight, a magnet coupled to the weight, a hollow can-shape coil for receiving the magnet, and a magnet fluid interposed between the coil and the magnet.

However, an inner space of the coil is frequently sealed by the magnetic fluid that is interposed between the coil and the magnet to decrease the vibration of the magnet.

BRIEF SUMMARY

The present disclosure is to provide a linear vibrator configured to improve a property of a vibration of the linear vibrator.

According to one aspect of the present disclosure, the object described above may be achieved by a housing having a bracket and a case coupled to the bracket to form a receiving space; a spring coupled to an inner face of the case; a vibration unit having a magnet, the magnet being coupled to the spring; a hollow can-shape coil disposed over the bracket for vibrating the vibration unit by using a magnetic field generated from the magnet and a magnet field generated from the coil; a substrate electrically connected to the coil, the substrate interposed between the coil and the bracket, and the substrate having an air venting portion communicating with an inner space of the coil and outside the coil.

According to another aspect of the present invention, the object described above may be achieved by a housing having a bracket and a case coupled to the bracket to form a receiving space; a spring coupled to an inner face of the case; a vibration unit having a magnet coupled to the spring; a hollow can-shaped coil, the coil disposed over the bracket for vibrating the magnet by using a magnetic field generated from the magnet and a magnet field generated from the coil; and a substrate interposed between the coil and the bracket, the substrate electrically connected to the coil, wherein the housing has an air venting portion for passing through an inner space of coil and outside the coil.

According to still another aspect of the present invention, the object described above may be achieved by a housing having a bracket and a case coupled to the bracket to form a receiving space; a spring coupled to an inner face of the case; a vibration unit having a magnet coupled to the spring; a hollow can-shaped coil disposed over the housing for vibrating the magnet by using a magnetic field generated from the magnet and a magnet field generated from the coil; and a substrate interposed between the coil and the bracket, the substrate electrically connected to the coil, wherein the bracket has at least one air venting portion passing through the bracket, the air venting portion disposed at a portion corresponding to an inside of the coil.

DETAILED DESCRIPTION OF THE INVENTION

Embodiment 1

Figure 1:
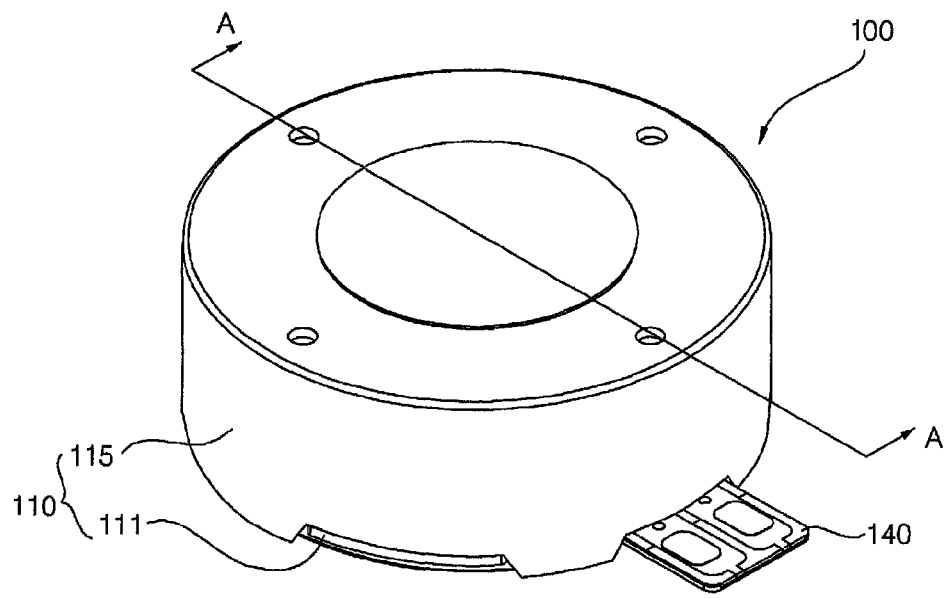
FIG. 1 is a perspective view illustrating a linear vibrator according to a first embodiment of the present invention.
Figure 2:
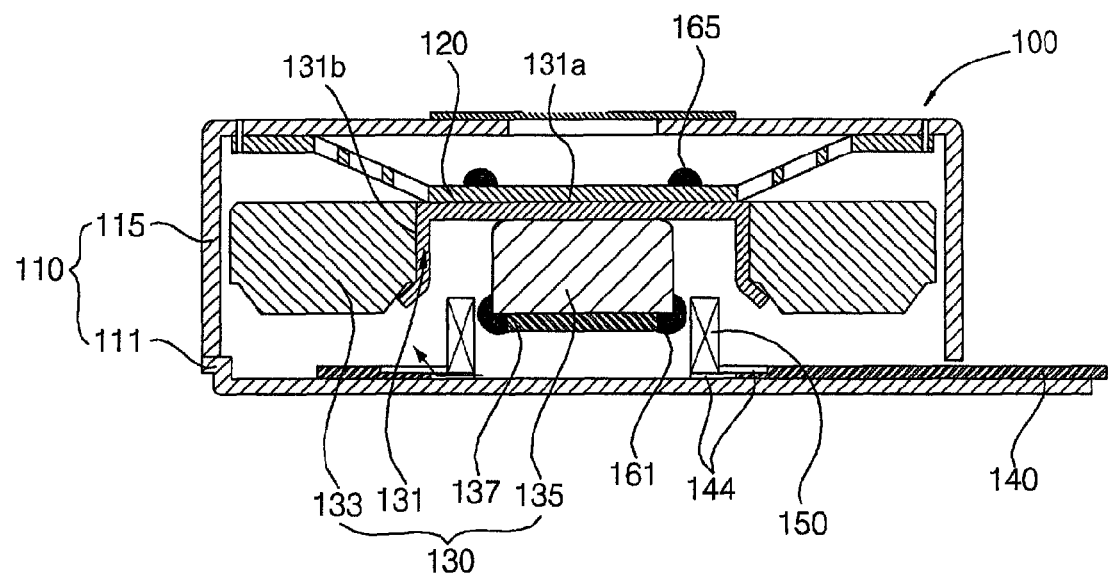
FIG. 2 is a cross-sectional view taken along a line A-A' in FIG. 1.
Figure 3:
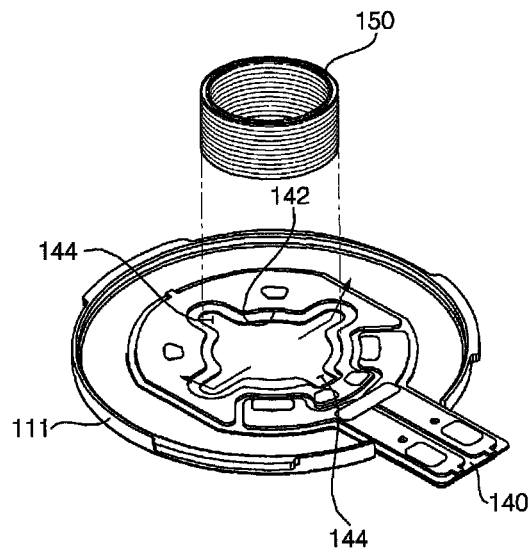
FIG. 3 is an exploded perspective view illustrating a bracket, a substrate, and a coil in FIG. 2.

FIG. 1 is a perspective view illustrating a linear vibrator according to a first embodiment of the present invention. FIG. 2 is a cross-sectional view taken along a line A-A' in FIG. 1. FIG. 3 is an exploded perspective view illustrating a bracket, a substrate, and a coil in FIG. 2.

Referring to FIGS. 1 to 3, a linear vibrator 100 includes a housing 110, a spring 120, a vibration unit 130, a substrate 140, and a coil 150.

The housing 110 has a bracket 111 and a case 115. The bracket 111 has a plate shape and the case 115 has a bottom-opened cylindrically hollow can-shape. The bracket 111 and the case 115 form a receiving space.

One end portion of the spring 120 is coupled to an inner face of the case 115. The one end portion of the spring 120 is, for example, welded to the inner face thereof. In this embodiment of the present invention, the spring 120 may include a plate spring.

The vibration unit 130 includes a yoke 131, a weight 133, and a magnet 135.

The yoke 131 has an upper plate 131a and a side plate 131b connected to the upper plate 131a.

The upper plate 131a of the yoke 131 has a disc shape when viewed from a plane. The upper plate 131a is coupled to the spring 120.

The side plate 131b of the yoke 131 has a cylindrically hollow pipe shape that is integrally coupled to an edge of the upper plate 131a. The yoke 131 having the upper plate 131a and the side plate 131b has a bottom-opened cylindrically hollow can-shape. A lower portion of the side plate 131b has a bent portion that is outwardly bent from the side plate 131b for inserting the weight 133 into an outer face of the side plate 131b.

The weight 133 is comprised of a metal, and the weight 133 has an opening or a recess to couple the weight 133 to the side plate 131b. Thus, the weight 133 and the side plate 131b are not separated from each other by the bent portion.

The magnet 135 is disposed in the yoke 131, the magnet 135 is disposed on an inner face of the upper plate 131a of the yoke 131. A side face of the magnet 135 is spaced apart from an inner face of the side plate 131b by the predetermined distance to form a space between the inner face of the side plate 131b and the side face of the magnet 135. In this embodiment of the present invention, the magnet 135, for example, has a shape similar to a cylinder, and the magnet 135 is concentrically disposed with the side plate 131b of the yoke 131.

In this embodiment of the present invention, the magnet 135 may be formed by a sintering process. The magnet 135 may include at least one through hole that passes through a lower face of the magnet 135 and the side face of the magnet 135. An air, which is trapped in a space formed by the coil 150, is discharged from the space of the coil 150 to outside of the coil 150 by using the through hole formed in the magnet 135.

However, an additional yoke 137 having a plate shape is disposed on the lower face of the magnet 135.

The coil 150 is disposed over the bracket 111. The coil 150 is wound on a conductive wire to have a pipe shape having a hollow portion.

The coil 150 is disposed at a position corresponding to that of the magnet 135, and the coil 150 has a diameter greater than that of the magnet 135 so that the magnet 135 is inserted into the coil 150.

The magnetic fluid 161 is disposed between the coil 150 and the side face of the magnet 135. For example, the magnetic fluid 161 may be formed on the side face of the magnet 135 in this embodiment of the present invention.

An electrical short between the magnet 135 and the coil 150 may be inhibited by the magnetic fluid 161 and an after-vibration time of the weight 133 also may be greatly reduced by the magnetic fluid 161.

The magnetic fluid is defined by a fluid made out of nanometer sized magnetic compounds each having a size of about 0.01 μm to about 0.02 μm, which are suspended in a liquid under a colloid state. The magnetic fluid further includes a surfactant for avoiding a precipitation or a cohesion in the magnetic fluid. The magnetic fluid has various characteristics, for example, such as maintaining a uniform concentration of the magnetic compounds, when a magnetic field, a gravity force, and a centrifugal force are applied from an external.

In this embodiment of the present invention, an additional magnetic fluid 165 may be formed at an upper face of the spring 120 coupled to the upper face of the yoke 131. The additional magnetic fluid 165 inhibits a noise generated between the spring 120 and the case 115, and the additional magnetic fluid 165 also inhibits an abrasion caused by contacting between the spring 120 and the case 115.

In a case the magnetic fluid 161 for inhibiting a contact between the magnet 135 and the coil 150 and for reducing the after-vibration time of the weight 133 is filled with a gap between the magnet 135 and the coil 150, a closed space may be formed in the coil 150 to decrease the vibration of the magnet 135 largely due to the closed space.

The substrate 140 is disposed on the upper face of the bracket 111, and the substrate 140 is electrically connected to an end portion of the coil 150.

The substrate 140 applies an electrical signal to the coil 150 to generate a magnetic filed from the coil 150. Thus, the magnet 135 vibrates in the coil 150 due to the magnetic field generated by the coil 150 and a magnetic field generated by the magnet 135.

The substrate 140 includes an air venting portion 144. The inner space of the coil 150 and outside of the coil 150 are connected to the air venting portion 144 formed at the substrate 140. In this embodiment of the present invention, the substrate 140 may include a flexible printed circuit board (FPCB) and the substrate 140 may have a doughnut shape having an inner face and an outer face facing the inner face.

The air venting portion 144 formed on the substrate 140 has a groove shape when viewed on a plane, one end portion of which is formed inside of the coil 150 and the other portion of the air venting portion 144 is formed outside the coil 150.

The groove-shaped air venting portion 140 extends from a portion of the inner face of the substrate 140 to the outer face of the substrate as shown in FIG. 3. In this embodiment of the present invention, at least one air venting portion 144 is formed at the substrate 140. Preferably, in a case a plurality of air venting portions 144 is formed at the substrate 140, each of the air venting portions 144 is formed at the substrate 140 at a uniform interval. In this embodiment of the present invention, four air venting portions 144 are formed at the substrate 140 each at a uniform interval.

In this embodiment of the present invention, the substrate 140 has a stepped portion 142 for coupling the coil 150. The stepped portion 142 is formed at a position corresponding to that of a lower end portion of the coil 150 opposite to an upper face of the substrate 140. The lower end portion of the coil 150 and a lower portion of the outer face of the coil 150 are coupled to the stepped portion 142 of the substrate 140.

The lower portion of the outer face of coil 150 and the lower end portion of the coil 150 are bonded to the stepped portion 142 of the substrate 140 by using an adhesive, whereas no adhesive is formed at a position corresponding to that of the air venting portion 144.

In this embodiment of the present invention, since the air venting portion 144 for connecting the inner space of the coil 150 to outside of the coil 150 is formed at the substrate 140, the air formed at the inner space of the coil 150 is rapidly discharged from the inner space of the coil 150 or the air formed outside of the coil 150 is rapidly introduced into the coil 150 to greatly increase the driving of the magnet 135, when the magnetic fluid 161 is completely filled with the gap between the coil 150 and the magnet 135.

The inner space of the coil 150 communicates with outside of the coil 150 by the air venting portion 144. In a case the inner space of the coil 150 is sealed by the magnetic fluid 161 interposed between the coil 150 and the magnet 135, air of the inner space of the coil 150 is discharged from the inner space of the coil 150 to outside of the coil 150 or air is introduced into the inner space of the coil 150 so that the magnet 135 has greatly improved the moving characteristic by the air venting portion 144 of the substrate 140.

Embodiment 2

Figure 4:
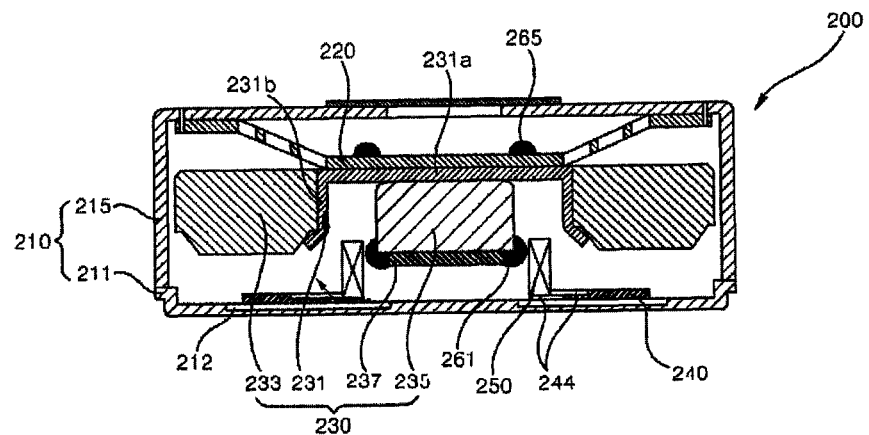
FIG. 4 is a cross-sectional view illustrating a linear vibrator according to a second embodiment of the present invention.
Figure 5:
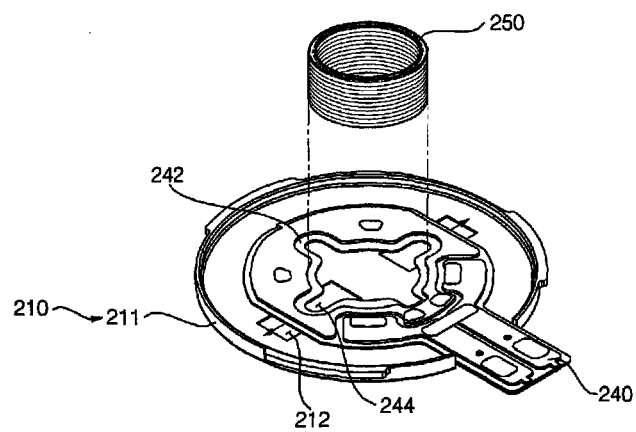
FIG. 5 is an exploded perspective view illustrating a bracket, a substrate, and a coil in FIG. 4.

FIG. 4 is a cross-sectional view illustrating a linear vibrator in according to another embodiment of the present invention. FIG. 5 is an exploded perspective view illustrating a bracket, a substrate, and a coil in FIG. 4.

Referring to FIGS. 4 and 5, a linear vibrator 200 includes a housing 210, a spring 220, a vibration unit 230, a substrate 240, and a coil 250.

The housing 210 has a bracket 211 and a case 215. The bracket 211 has a plate shape and the case 215 has a bottom-opened cylindrically hollow can-shape to form a receiving space therein.

In this embodiment of the present invention, an upper face of the bracket 211 has a region, the coil 250 described below is disposed on the region of the bracket 211. An air venting portion 212 is formed on the upper face of the bracket 211. The air venting portion 212 has a groove shape when viewed from a plane. One end portion of the air venting portion 212 is formed within the region and the other end portion, which is opposite to one end portion, of the air venting portion 212 is formed outside of the region.

A depth of the air venting portion 212 of the bracket 211 is less than that of a thickness of the bracket 211 when viewed from a cross-section. At least one air venting portion 212 is formed at an upper face of the bracket 211. Preferably, at least two air venting portions 212 are formed at the upper face of the bracket 211.

One end portion of the spring 220 is coupled to an inner face of the housing 210 and the other end portion of the spring 220 is coupled to an upper face of a yoke 231 described below. The one end portion of the spring 220 is welded to the inner face of the housing 210. The spring 220 may include a plate spring.

The vibrator 230 includes a yoke 231, a weight 233, and a magnet 235.

The yoke 231 has an upper plate 231a and a side plate 231b connected to the upper plate 231a.

The upper plate 231a of the yoke 231 has a disc shape when viewed from a plane, the side plate 231b of the yoke 231 has a cylindrically hollow pipe shape that is coupled to an edge of the upper plate 231a. The yoke 231 has a bottom-opened cylindrically hollow can-shape. Meanwhile, a lower portion of the side plate 231b has a bent portion that is outwardly bent from the side plate 231b so as to couple the weight 233 to an outer face of the side plate 231b.

The weight 233 may be comprised of a metal and the weight 233 has an opening or a recess for coupling the weight 233 to the side plate 231b of the yoke 231b. Thus, the weight 233 and the side plate 231b are not separated from each other by the bent portion.

The magnet 235 is disposed in the yoke 231. The magnet 235 is disposed on an inner face of the upper plate 231a of the yoke 231. A side face of the magnet 235 is spaced apart from an inner face of the side plate 131b by the predetermined distance.

In this embodiment of the present invention, the magnet 235, for example, has a shape similar to a cylinder, and the magnet 235 is concentrically disposed with the side plate 231b of the yoke 231.

In this embodiment of the present invention, the magnet 235 may be formed by a sintering process. The magnet 235 may include at least one through hole that passes through a lower face of the magnet 235 and a side face of the magnet 235. An air trapped in a space that is formed in the coil 250 is discharged from inside of the coil 250 to outside of the coil 250 by using the through hole formed therein.

However, an additional yoke 237 having a plate shape is disposed on the lower face of the magnet 235.

The coil 250 is disposed over the bracket 211. The coil 250 is wound on a conductive wire and the coil 250 has a pipe shape having a hollow portion.

The coil 250 is disposed at a position corresponding to that of the magnet 235, and the coil 250 has a diameter greater than that of the magnet 235 so that the magnet 235 is inserted into the coil 150.

Meanwhile, the magnetic fluid 261 is disposed between the coil 250 and the side face of the magnet 235. For example, the magnetic fluid 261 may be formed on the side face of the magnet 235 in this embodiment of the present invention.
An electrical short between the magnet 235 and the coil 250 may be inhibited by the magnetic fluid 261 and an after-vibration time of the weight 233 may be greatly reduced.

The magnetic fluid 261 is defined by a fluid made out of nanometer sized magnetic compounds having a size of about 0.01 μm to about 0.02 μm, which are suspended in a liquid under a colloid state. The magnetic fluid further includes a surfactant for avoiding a precipitation or a cohesion in the magnetic fluid. The magnetic fluid has various characteristics, for example, such as maintaining a uniform concentration of the magnetic compounds, in a case a magnetic field, a gravity force, and a centrifugal force are applied from an external.

In this embodiment of the present invention, an additional magnetic fluid 265 may be formed at an upper face of the spring 220 coupled to the upper face of the yoke 231. The additional magnetic fluid 265 inhibits a noise generated between the spring 220 and the case 215, and the additional magnetic fluid 265 also inhibits an abrasion caused by a contact between the spring 220 and the case 215.

In a case the magnetic fluid 261 for inhibiting a contact between the magnet 235 and the coil 250 and for reducing the after vibration time of the weight 233 is filled with a gap between the magnet 235 and the coil 250, a closed space is formed in the coil 250 so that the vibration of the magnet 235 decreases due to the closed space.

Referring again to FIGS. 4 and 5, the substrate 240 is disposed on the bracket 211 and the substrate 240 is electrically connected to an end portion of the coil 250.

The substrate 240 applies an electrical signal to the coil 250 to generate a magnetic field from the coil 250. Thus, the magnet 235 vibrates in the coil 250 due to the magnetic field generated by the coil 250 and a magnetic field generated by the magnet 235.

The substrate 240 includes an additional air venting portion 244. The additional air venting portion 244 formed at the substrate 240 passes through the inner space of the coil 250 to outside of the coil 250 so as to inhibit the closed space to be formed in the coil 250 by the magnetic fluid 261.

In this embodiment of the present invention, the substrate 240 may include a flexible printed circuit board (FPCB) and the substrate 240 may have a doughnut shape having an inner face and an outer face facing the inner face.

An inner space formed between the magnet 235 and the coil 250 communicates with outside of the coil 250 by the additional air venting portion 244 of the substrate 240 as well as the air venting portion 212 of the bracket 211 and the air venting portion 212 formed at the bracket 211 to inhibit decreasing the vibration of the magnet 235 based on a sealing of the inner space by the magnetic fluid 261.

The additional air venting portion 244 formed on the substrate 240 has a groove shape when viewed from a plane, one end portion of which is disposed inside the coil 250 and the other portion of the air venting portion 244 is disposed outside of the coil 250.

The additional air venting portion 244, which has a groove shape when viewed from a plane, extends from a portion of the inner face of the substrate 240 to the outer face of the substrate as shown in FIG. 4. In this embodiment of the present invention, at least one additional air venting portion 244 is formed at the substrate 240. Preferably, in a case a plurality of additional air venting portions 244 is formed at the substrate 240, the additional air venting portion 244 are formed at the substrate 240 at a uniform interval. In this embodiment of the present invention, four additional air venting portions 244 are formed at the substrate 240.

In this embodiment of the present invention, the additional air venting portions 244 and the air venting portion 212 formed at the bracket 211 are formed at a same position. Alternatively, the additional air venting portions 244 of the substrate 240 are positioned at a different position from the air venting portion 212.

In this embodiment of the present invention, a stepped portion 242 is formed at the substrate 240. The stepped portion 242 is formed at a position corresponding to that of a lower end portion of the coil 250 opposite to the upper face of the substrate 240. The lower end portion of the coil 250 and a lower portion of an outer face of the coil 250 are coupled to the stepped portion 242 of the substrate 240.

The lower portion of the outer face of coil 250 and the lower end portion of the coil 250 are bonded to the stepped portion 242 of the substrate 240 by using an adhesive. No adhesive is formed at a position corresponding to that of the air venting portion 212 of the bracket 211 and that of the additional air venting portion 244 of the substrate 240.

In this embodiment of the present invention, since the air venting portion 212 for connecting the inside of the coil 250 to outside of the coil 250 is formed at the bracket 211, the air formed at the inner space of the coil 250 is rapidly discharged from the inner space of the coil 250 or the air formed outside of the coil 250 is rapidly introduced into inside of the coil 250 to greatly increase the driving of the magnet 235, in a case the magnetic fluid 261 is completely filled with the gap between the coil 250 and the magnet 235.

The inner space of the coil 250 communicates with outside of the coil 250 by the additional air venting portion 244. In a case the gap between the coil 250 and the magnet 235 is filled with the magnetic fluid 261, air of the inner space of the coil 250 is discharged from the inner space of the coil 250 to outside of the coil 250 or air is introduced into the inner space of the coil 250 so that the magnet 235 greatly improves the moving characteristics by the air additional venting portion 244 of the substrate 240.

Embodiment 3

Figure 6:
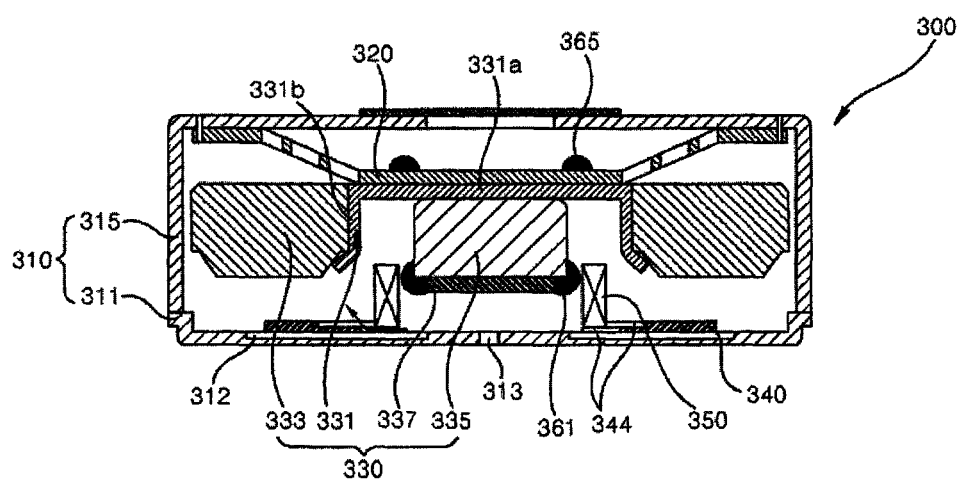
FIG. 6 is a cross-sectional view illustrating a linear vibrator according to a third embodiment of the present invention.
Figure 7:
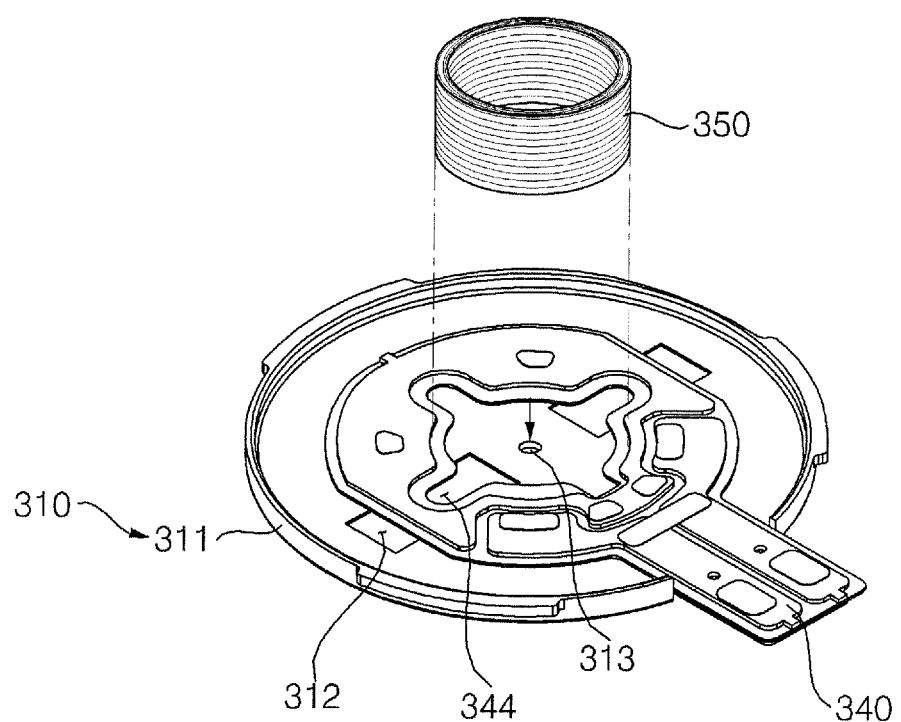
FIG. 7 is an exploded perspective view illustrating a linear vibration in FIG. 6.

FIG. 6 is a cross-sectional view illustrating a linear vibrator in according to still another embodiment of the present invention. FIG. 7 is an exploded perspective view illustrating a bracket, a substrate, and a coil in FIG. 6.

Referring to FIGS. 6 and 7, a linear vibrator 300 includes a housing 310, a spring 320, a vibration unit 330, a substrate 340, and a coil 350.

The housing 310 has a bracket 311 and a case 315. The bracket 311 has a plate shape and the case 315 has a bottom-opened cylindrically hollow can-shape for forming a receiving space by the bracket 311 and the case 315.

In this embodiment of the present invention, the bracket 311 has a region for coupling the coil 350. The bracket 311 has at least one air venting portion 313 that passes through the bracket 311. The air venting portion 313 is formed in the region of the bracket 311. Alternatively, the bracket 311 may further include an additional air venting portion 312.

The additional air venting portion 312 has a groove shape when viewed from a plane. One end portion of the additional air venting portion 312 is formed within the region and the other end portion, which is opposite to one end portion, of the additional air venting portion 312 is formed at outside of the region.

A first depth of the additional air venting portion 312 is less than a second depth of the bracket 312 when viewed from a cross-section. At least one additional air venting portion 312 is formed at an upper face of the bracket 311. Preferably, at least two additional air venting portions 312 are formed at the upper face of the bracket 311.

One end portion of the spring 320 is coupled to an inner face of the housing 310. The one end portion of the spring 320 is welded to the inner face of the housing 310. The spring 320 may include a plate spring.

The vibrator 330 includes a yoke 331, a weight 333, and a magnet 335.

The yoke 331 has an upper plate 331a and a side plate 331b connecting to the upper plate 331a.

The upper plate 331a of the yoke 331 has a disc shape when viewed from a plane, and the side plate 331b of the yoke 331 has a cylindrically hollow pipe shape that is coupled to an edge of the upper plate 331a. The yoke 331, which has the upper plate 331a and the side plate 331b, has a bottom-opened cylindrically hollow can-shape. Meanwhile, a lower portion of the side plate 331b has a bent portion that is outwardly bent from the side plate 331b so as to couple the weight 333 to an outer face of the side plate 331b.

The weight 333 may be comprised of a metal and the weight 333 has an opening or a recess so as to couple the weight 333 to the side plate 331b of the yoke 331b. Thus, the weight 333 and the side plate 331b are not separated from each other by the bent portion.

The magnet 335 is disposed in the yoke 331. The magnet 335 is disposed on an inner face of the upper plate 331a of the yoke 331. A side face of the magnet 335 disposed on the inner face of the yoke 331 is spaced apart from an inner face of the side plate 331b by a predetermined distance. In this embodiment of the present invention, the magnet 335, for example, has a shape similar to a cylinder, and the magnet 335 is concentrically disposed with the side plate 331b of the yoke 331.

In this embodiment of the present invention, the magnet 335 may be formed by a sintering process. The magnet 335 may include at least one through hole that passes through a lower face of the magnet 335 and a side face of the magnet 335. An air trapped in a space formed in the coil 350 is discharged from the coil 350 to outside of the coil 350 by using the through hole of the magnet 335.

However, an additional yoke 337 having a plate shape may be disposed on the lower face of the magnet 335.

The coil 350 is disposed over the bracket 311. The coil 350 is wound on a wire and the coil 350 has a pipe shape having a hollow portion.

The coil 350 is disposed at a position corresponding to that of the magnet 335, and the coil 350 has a diameter greater than that of the magnet 335 so that the magnet 335 is inserted into the coil 350.

Meanwhile, the magnetic fluid 361 is disposed between the coil 350 and the side face of the magnet 335. For example, the magnetic fluid 361 may be formed on the side face of the magnet 335 in this embodiment of the present invention.

An electrical short between the magnet 335 and the coil 350 may be inhibited by the magnetic fluid 361 and an after-vibration time of the weight 333 may be greatly reduced.

The magnetic fluid is defined by a fluid made out of nanometer sized magnetic compounds each having a size of about 0.01 μm to about 0.02 μm, which are suspended in a liquid similar under a colloid state. The magnetic fluid further includes a surfactant for avoiding a precipitation or a cohesion in the magnetic fluid. The magnetic fluid has various characteristics, for example, such as maintaining a uniform concentration of the magnetic compounds, in a case a magnetic field, a gravity force, and a centrifugal force are applied from an external.

In this embodiment of the present invention, an additional magnetic fluid 365 may be formed at an upper face of the spring 320 coupled to the upper face of the yoke 331. The additional magnetic fluid 365 inhibits a noise generated by the spring 320 and the case 315, the additional magnetic fluid 365 inhibits an abrasion of the spring 320 or the case 315 caused by a contact between the spring 320 and the case 315.

In a case the magnetic fluid 361 for inhibiting a contact between the magnet 335 and the coil 350 and for reducing the after-vibration time of the weight 333 is filled with a gap between the magnet 335 and the coil 350, a closed space is formed in the coil 350 to decrease the vibration of the magnet 335 largely due to the closed space.

Referring again to FIGS. 6 and 7, the substrate 340 is disposed on the bracket 311, and the substrate 340 is electrically connected to an end portion of the coil 350.

Referring to FIGS. 6 and 7, the substrate 340 is disposed on the bracket 311 having the air venting portion 312 that has a groove shape. The substrate 340 is electrically connected to the coil 350.

The substrate 340 applies an electrical signal to the coil 350 to generate a magnetic field from the coil 350. Thus, the magnet 335 vibrates in the coil 350 due to the magnetic field generated by the coil 350 and a magnetic field generated by the magnet 335.

The substrate 340 includes an additional air venting portion 344. The additional air venting portion 344 formed at the substrate 340 connects the inner space of the coil 350 to outside of the coil 350 to inhibit the closed space from being formed in the coil 350 by the magnetic fluid 361.

In this embodiment of the present invention, the substrate 340 may include a flexible printed circuit board (FPCB) and the substrate 340 may have a doughnut shape having an inner face and an outer face facing the inner face.

An inner space formed between the magnet 335 and the coil 350 communicates with outside of the coil 250 by the air venting portion 313 that passes through the bracket 311 and the additional air venting portion 312 formed at the bracket 312 to inhibit decreased the vibration of the magnet 330 caused by a sealing of the inner space by the magnetic fluid 361.

The additional air venting portion 344 formed on the substrate 340 has a groove shape when viewed from a plane, one end portion of the additional air venting portion 344 is disposed within the coil 350 and the other portion of which is disposed on the substrate 340 corresponding to the external of the coil 350.

The additional air venting portion 344, which has a groove shape when viewed from a plane, is formed from a portion of the inner face of the substrate 340 to the outer face of the substrate as shown in FIG. 6. In this embodiment of the present invention, at least one additional air venting portion 344 is formed at the substrate 340. Preferably, in a case a plurality of air venting portion 344 is formed at the substrate 340, each of the additional air venting portions 344 is formed at the substrate 340 at a uniform interval. In this embodiment of the present invention, four additional air venting portions 344 are formed at the substrate 240.

In this embodiment of the present invention, the additional air venting portion 344 formed at the substrate 340 and the air venting portion 312 that is formed at the bracket 311 are formed at a same position. Alternatively, the additional air venting portion 344 of the substrate 340 is positioned at a different position from the air venting portion 312.

In this embodiment of the present invention, a stepped portion 342 is formed at the substrate 340 for coupling the coil 350. The stepped portion 342 is formed at a position corresponding to that of a lower end portion of the coil 350 opposite to the upper face of the substrate 340. The lower end portion of the coil 350 and a lower portion of an outer face of the coil 350 are coupled to the stepped portion 342 of the substrate 340.

The lower portion of the outer face of coil 350 and the lower end portion of the coil 350 are bonded to the stepped portion 342 of the substrate 340 by using an adhesive. No adhesive is formed at a position corresponding to that of the air venting portion 312 of the bracket 311 and that of the additional venting portion 344 of the substrate 340.

In this embodiment of the present invention, since the air venting portion 313 for connecting the inner space of the coil 350 to outside of the coil 350 is formed at the bracket 211, the air formed at the inner space of the coil 350 is rapidly discharged from the inner space of the coil 350 or the air formed outside of the coil 350 is rapidly introduced into the coil 350 to greatly increase the driving of the magnet 335, in a case the magnetic fluid 361 is completely filled with the gap between the coil 350 and the magnet 335.

However, the inner space of the coil 350 may communicate with outside of the coil 350 by the additional air venting portion 344 that passes through the bracket 311. In a case the inner space of the coil 350 is sealed by the magnetic fluid 361 interposed between the coil 350 and the magnet 335, air of the inner space of the coil 350 is discharged from the inner space of the coil 350 to outside of the coil 350 or air is introduced into the inner space of the coil 350 so that the magnet 335 greatly improves the moving characteristics by the air venting portion 313 of bracket 311, the additional venting portion 312 of the bracket 311 and the additional venting portion 344 of the substrate 340.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A linear vibrator comprising:
a housing having a bracket and a case coupled to the bracket to form a receiving space;
a spring coupled to an inner face of the case;
a vibration unit having a magnet, the magnet being coupled to the spring;
a coil, which has a hollow can-shape, disposed over the bracket for vibrating the vibration unit by using a magnetic field generated from the magnet and a magnet field generated from the coil; and
a substrate electrically connected to the coil and the substrate interposed between the coil and the bracket, the substrate having an air venting portion being communicated with an inner space of the coil and outside of the coil,
wherein the air venting portion has a groove shape, a first end portion of the air venting portion is formed at the inner space of the coil, the air venting portion passes air through a lower end portion of the coil, and a second end portion that is opposite to the first end portion of the air venting portion,
wherein the second end portion of the air venting portion extends outside an outer circumference of the coil in a radial direction of the coil.

2. The linear vibrator of claim 1, wherein at least two air venting portions are disposed on the substrate at a uniform interval.

3. The linear vibrator of claim 1, wherein the substrate has an outer face and inner face that is opposite to the outer face, the substrate has a stepped portion for supporting a lower portion of an outer face of the coil and a lower end portion, which contacts the substrate, of the coil.

4. The linear vibrator of claim 1, further comprising:
an adhesive formed between the substrate and the coil.

5. The linear vibrator of claim 1, wherein the vibrator includes a yoke coupled with the spring and a weight coupled to an outer face of the yoke.

6. The linear vibrator of claim 5, wherein the yoke includes an upper plate and a side plate that extends to the upper plate, the weight is coupled to an outer face of the side plate and the magnet is coupled to an inner face of the upper plate.

7. The linear vibrator of claim 1, wherein the coil has a hollow hole for receiving the magnet.

8. The linear vibrator of claim 1, further comprising:
a magnetic fluid being interposed between the magnet and the coil.

9. A linear vibrator comprising:
a housing having a bracket and a case coupled to the bracket to form a receiving space;
a spring coupled to an inner face of the case;
a vibration unit having a magnet coupled to the spring;
a coil, which has a hollow can-shape, the coil disposed over the bracket for vibrating the magnet by using a magnetic field generated from the magnet and a magnet field generated from the coil; and
a substrate interposed between the coil and the bracket, the substrate electrically connected to the coil;
wherein the bracket has an air venting portion for passing air through an inner space of the coil and outside of the coil,
wherein the air venting portion formed on the bracket has a groove shape when viewed on a plane, a first end portion of the air venting portion is formed at an inner space of the coil, the air venting portion passes air through a lower end portion of the coil, and a second end portion of the air venting portion that is opposite to the first portion is formed at an outer space of the coil
wherein the second end portion of the air venting portion extends outside an outer circumference of the coil in a radial direction of the coil.

10. The linear vibrator of claim 9, wherein the substrate has an additional air venting portion having a groove shape for connecting the inner space of the coil to outside of the coil, one end portion of the additional air venting portion is formed in the inner space of the coil and the other end portion of the additional air venting portion is formed outside of the coil.

11. The linear vibrator of claim 10, wherein the additional venting portion is disposed at a position corresponding to the air venting portion.

12. The linear vibrator of claim 9, wherein the substrate has an outer face and an inner face that is opposite to the outer face, the substrate has a stepped portion for supporting a lower portion of an outer face of the coil and a lower end portion, which contacts the substrate, of the coil.

13. The linear vibrator of claim 9, further comprising:
an adhesive formed along a portion that contacts the substrate and the coil.

14. The linear vibrator of claim 9, wherein the vibrator includes a yoke coupled to the spring, and a weight coupled to an outer face of the yoke.

15. The linear vibrator of claim 14, wherein the yoke includes an upper plate and a side plate that extends to the upper plate, the weight is coupled to an outer face of the side plate, and the magnet is coupled with an inner face of the upper plate of the yoke.

16. The linear vibrator of claim 9, further comprising:
a magnetic fluid interposed between the magnet and the coil.

17. A linear vibrator comprising:
a housing having a bracket and a case coupled to the bracket to form a receiving space;
a spring coupled to an inner face of the case;
a vibration unit having a magnet coupled to the spring;
a coil, which has a hollow can-shape, disposed over the bracket for vibrating the magnet by using a magnetic field generated from the magnet and a magnet field generated from the coil; and
a substrate interposed between the coil and the bracket, the substrate electrically connected to the coil;
wherein the bracket has at least one air venting portion,
wherein the air venting portion has a groove shape, a first end portion of the air venting portion is formed at the inner space of the coil, the air venting portion passes air through a lower end portion of the coil, and a second end portion that is opposite to the first end portion of the air venting portion,
wherein the bracket has at least one through hole passing air through the bracket, the through hole being disposed at a portion corresponding to that of an inside of the coil,
wherein the second end portion of the air venting portion extends outside an outer circumference of the coil in a radial direction of the coil.

18. The linear vibrator of claim 17, wherein the substrate, which has a doughnut shape, has an outer face and an inner face that is opposite to the outer face, the substrate has a stepped portion for supporting a lower portion of an outer face of the coil and a lower end portion, which contacts the substrate, of the coil.

19. The linear vibrator of claim 17, further comprising:
an adhesive formed along a portion that contacts the substrate and the coil.

* * * * *